Patented Nov. 28, 1922.

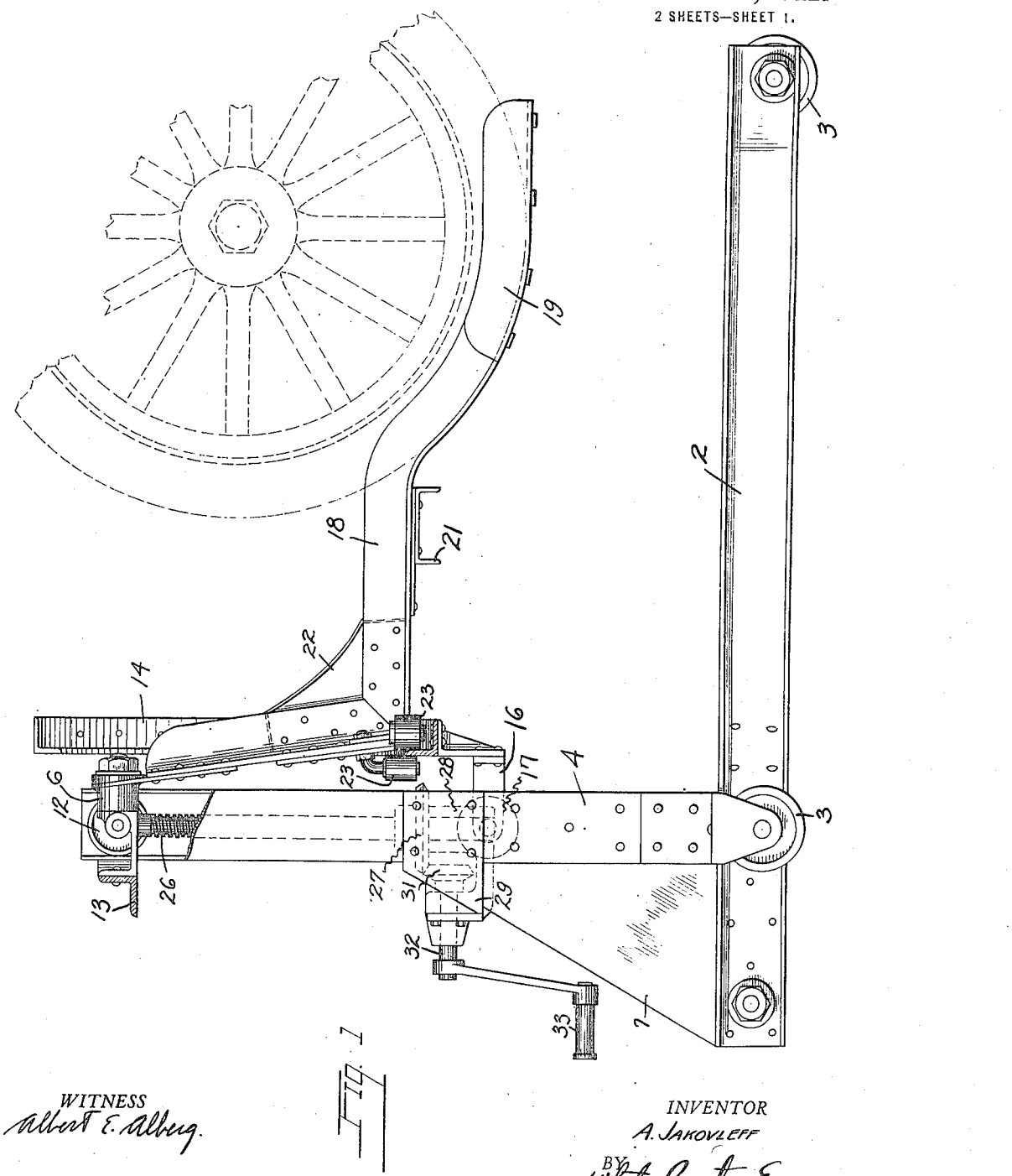

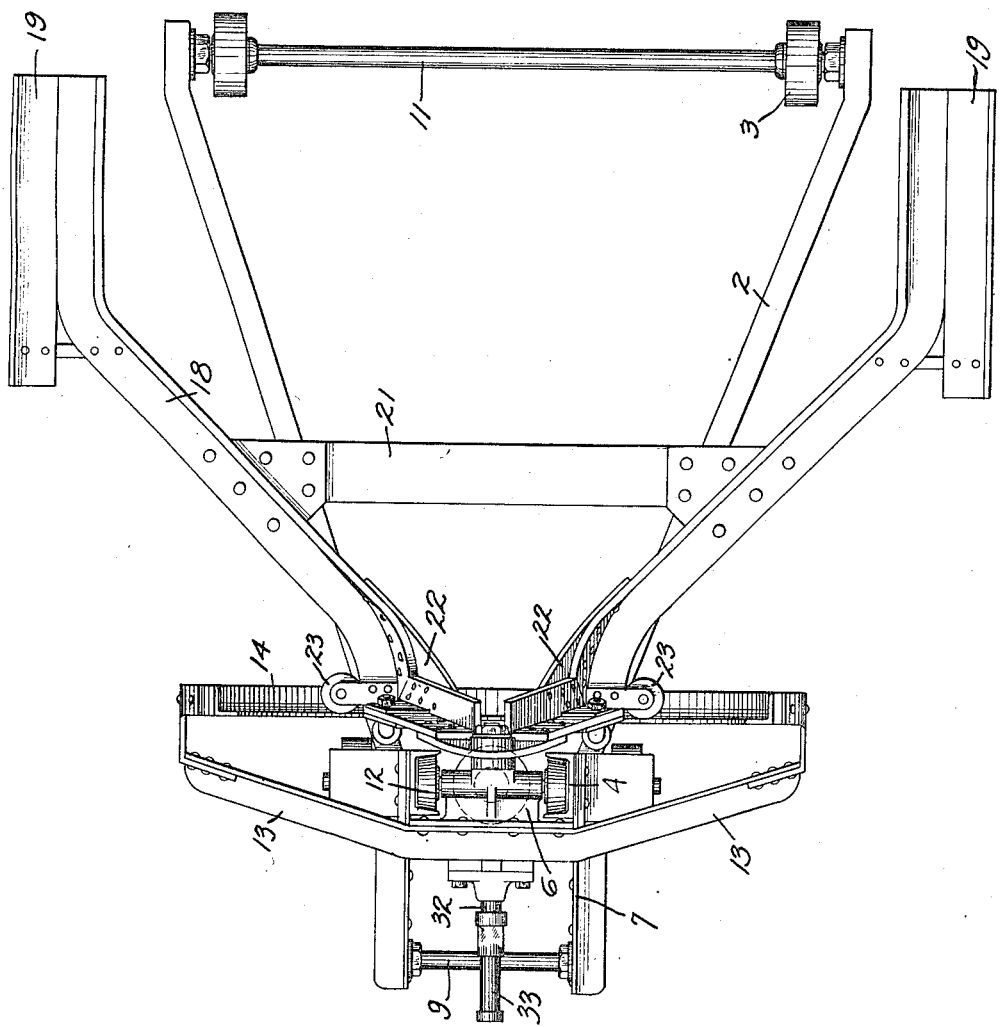

1,436,808

UNITED STATES PATENT OFFICE.

ALEXIS JAKOVLEFF, OF SAN FRANCISCO, CALIFORNIA, ASSIGNOR TO HERBERT M. SHIREK, OF SAN FRANCISCO, CALIFORNIA.

AUTOMOBILE CRADLE.

Application filed July 21, 1921. Serial No. 486,388.

*To all whom it may concern:*

Be it known that I, ALEXIS JAKOVLEFF, a citizen of Russia, and a resident of the city and county of San Francisco, State of California, have invented a new and useful Automobile Cradle, of which the following is a specification.

My invention relates to devices with which an automobile may be raised and tipped about a horizontal longitudinal axis to permit examination and repair of the under parts of the machine. One of the objects of the invention is the provision of a cradle in which an automobile may be quickly mounted and turned upwardly about its horizontal axis.

Another object of the invention is the provision of a cradle of the kind described of rugged, durable construction and one which can be made at low cost, and with a minimum of moving or adjustable parts.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

Referring to the drawings, Fig. 1 is a side elevation and Fig. 2 is a plan view of one of the cradles.

My invention comprises two similar mechanisms, one for each end of the vehicle. Each mechanism comprises a frame formed of horizontal elements 2 mounted on rollers 3 to lie close to the floor. A vertical post is fixed on the horizontal frame and comprises a pair of parallel channel beams 4 disposed with the open sides facing each other so that a slideway is provided in the posts in which the head 6 is vertically movable. Angle plates 7 brace the post members upon the frame and rods 9 and 11 connect the horizontal frame parts into a rigid whole.

On each side of the head 6 are mounted rollers 12 adapted to engage in the channel beams. Fixed to the head and extending laterally on each side are the arms 13 from which is suspended the buttress bar 14 which curves downwardly from the arms 13 in an arc. At the lowermost point of the arc is fixed a bracket 16 carrying rollers 17 engaged in the slideway of the post. These rollers are similar to rollers 12 and perform the function of slidably supporting the lower end of the arcuate buttress bar on the channel beams 4.

Pivotally mounted on the head 6 in an axis concentric with the curvature of the arcuate buttress bar is a bifurcated member or yoke comprising arms 18 which extend downwardly from the axis then outwardly in L-form. The outer ends are curved, as shown in Fig. 1, and are provided with additional curved members 19 which with the ends of the arms form wheel seats in which the wheels of the automobile may rest when the automobile is cradled in the device. The arms 18 are suitably braced by the cross-bar 21 and by the angle plates 22 at the turn of the L. The parts are so proportioned that the angle of each arm lies adjacent to the buttress bar, and rollers 23 are arranged on each arm, as best shown in Fig. 2, to bear on both sides of the buttress bar, which therefore supports the horizontal outward thrust of the arms when they are loaded. Since there are two sets of rollers 23 spaced some distance apart, and since the arcuate buttress bar is concentric with the axis of the pivotal mounting of the arms 18, the arms may be turned with their load to any desired position, the rollers 23 giving stability and permitting free movement of the frame.

Means are provided for raising and lowering the head 6. Extending downwardly from the head is a threaded spindle 26, fixed in the head but threaded thru the geared nut 27, mounted for rotary movement on the annular bracket 28 which forms part of the block 29 fixed across the two channel beams. The geared nut 27 is in mesh with a pinion 31 fixed on the shaft 32 journalled in the block 29, and the crank handle 33 provides means for manually rotating the geared nut to raise and lower the threaded spindle and hence the head and supporting mechanism.

*Operation.*—When it is desired to work on the under side of an automobile, the front wheels of the car are run upon the wheel seats of one part of my cradle, such wheel seats having been previously lowered into contact with the floor. Any suitable means, such as a shackle or short piece of chain is then applied to the wheel and supporting arm on each side to retain the wheel in the wheel seat, and the crank 33 turned to raise the wheel seats free of contact with the floor so that the weight of the front end of the car is carried on the cradle. The other or rear half of the cradle is then pushed up close to the rear wheel and the car backed onto the rear wheel seats, the front cradle being carried rearwardly with movement of the car. The heads of both cradles are then raised to permit the car to be tipped. The proportioning and size of the arms 18 are such that the center of gravity of the car supported on the cradle will lie a little below the axis about which the car is turned.

It is found that there is so little variation in the standard automobile that arms of fixed size may be provided and that the car when raised upon the arms may be tilted to the position desired without special mechanical means being required for that purpose, the friction of the moving parts being sufficient to retain the car in the desired position.

I claim:

1. A vehicle cradle comprising a post, a head mounted for vertical movement on said post, an arm for supporting one end of the vehicle pivoted to said head, and buttress means for additionally supporting said arm.

2. A vehicle cradle comprising a post, a head mounted for vertical movement on said post, an arm for supporting one end of the vehicle pivoted to said head, and a buttress bar fixed on said head for additionally supporting said arm.

3. A vehicle cradle comprising a post, a head mounted for vertical movement on said post, an arm for supporting one end of the vehicle pivoted to said head, and an arcuate buttress bar fixed on said head concentric with the axis of said arm for additionally supporting said arm.

4. A vehicle cradle comprising a post, a head mounted for vertical movement on said post, an arm for supporting one end of the vehicle pivoted to said head, an arcuate buttress fixed on said head concentric with the axis of said arm, and rollers on said arm engaging said bar.

5. A vehicle cradle comprising a post, a head mounted for vertical movement on said post, an arm for supporting one end of the vehicle pivoted to said head, a buttress bar fixed on said head for additionally supporting said arm, and a roller fixed on said bar for engagement with said post.

6. A vehicle cradle comprising a post, a head mounted for vertical movement on said post, an arm for supporting one end of the vehicle pivoted to said head, a buttress bar fixed on said head for additionally supporting said arm, and means for raising and lowering said head.

7. A vehicle cradle comprising a post, a head mounted for vertical movement on said post, an arm for supporting one end of the vehicle pivoted to said head, a buttress bar fixed on said head for additionally supporting said arm, a threaded spindle fixed on said head, a geared nut for moving said spindle, and means for turning said nut.

8. A vehicle cradle comprising a post formed of parallel channel beams, a head mounted for vertical movement on said post, a buttress bar fixed on said head, an arm for supporting one end of the vehicle pivoted on said head, and rollers interposed between the head and post, between the buttress bar and post, and between the arm and the buttress bar.

9. A vehicle cradle comprising a frame, rollers on said frame, a post fixed on said frame, a head mounted for vertical movement on said post, an arm for supporting one end of the vehicle pivoted to said head, a buttress bar fixed on said head for additionally supporting said arm, and means for raising and lowering said head.

10. A vehicle cradle comprising a portable frame, a post formed of parallel channel beams opening toward each other fixed on said frame, a head, an arcuate buttress bar fixed on and extending downwardly from said head, rollers engaged in said channel beams mounted on said head and buttress bar, an L-shaped arm for supporting one end of the vehicle pivoted to said head and engaged with the buttress bar adjacent its angle, and means for raising and lowering said head on said post.

In testimony whereof, I have hereunto set my hand.

ALEXIS JAKOVLEFF.